No. 860,431. PATENTED JULY 16, 1907.
G. M. ANDERSSON.
CAR FENDER.
APPLICATION FILED SEPT. 25, 1906.

2 SHEETS—SHEET 1.

WITNESSES
G. V. Rasmussen
R. W. Hardie

INVENTOR
Gustaf M. Andersson
BY Munn & Co
ATTORNEYS

No. 860,431. PATENTED JULY 16, 1907.
G. M. ANDERSSON.
CAR FENDER.
APPLICATION FILED SEPT. 25, 1906.
2 SHEETS—SHEET 2.
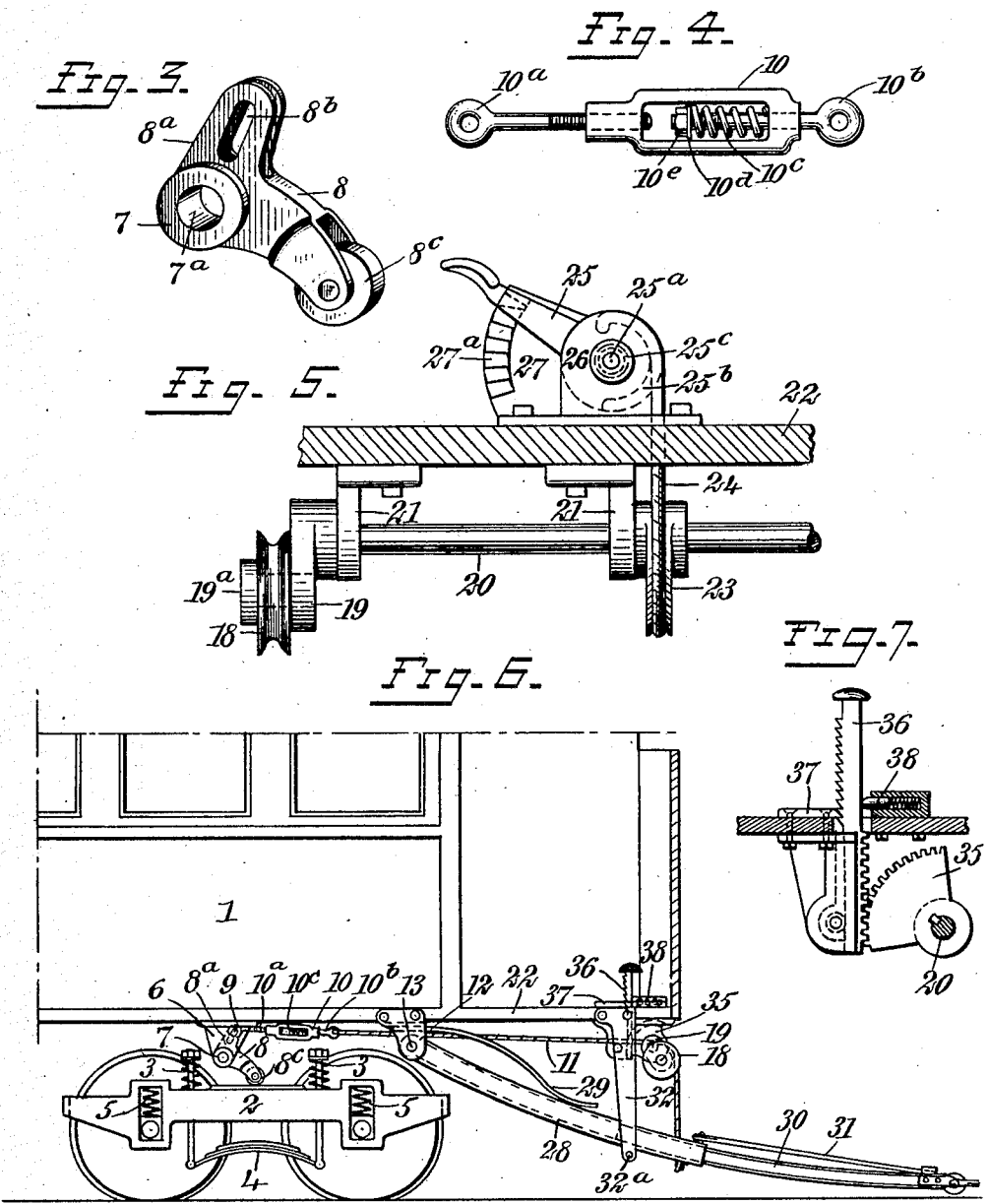
WITNESSES
G. V. Rasmussen
R. W. Hardie
INVENTOR
Gustaf M. Andersson
BY Munn & Co
ATTORNEYS
THE NORRIS PETERS CO., WASHINGTON, D. C.

UNITED STATES PATENT OFFICE.

GUSTAF M. ANDERSSON, OF HYDE PARK, MASSACHUSETTS.

CAR-FENDER.

No. 860,431.  Specification of Letters Patent.  Patented July 16, 1907.

Application filed September 25, 1906. Serial No. 336,169.

*To all whom it may concern:*

Be it known that I, GUSTAF M. ANDERSSON, a citizen of the United States, and a resident of Hyde Park, in the county of Norfolk and State of Massachusetts, have invented a new and Improved Car-Fender, of which the following is a full, clear, and exact description.

My invention has for its object to provide a car fender with means adapted to compensate for the vertical vibration of a car body on its truck, and thereby maintain the forward portion of the fender at a constant elevation from the track, to provide means for adjusting the fender bodily at the desired elevation, to enable the forward end of the fender to be dropped automatically by an object in its path, and to pass under an object and raise it on to the fender instead of striking it, and to operate under all conditions promptly and efficiently without attention or assistance on the part of a motorman.

Figure 1:
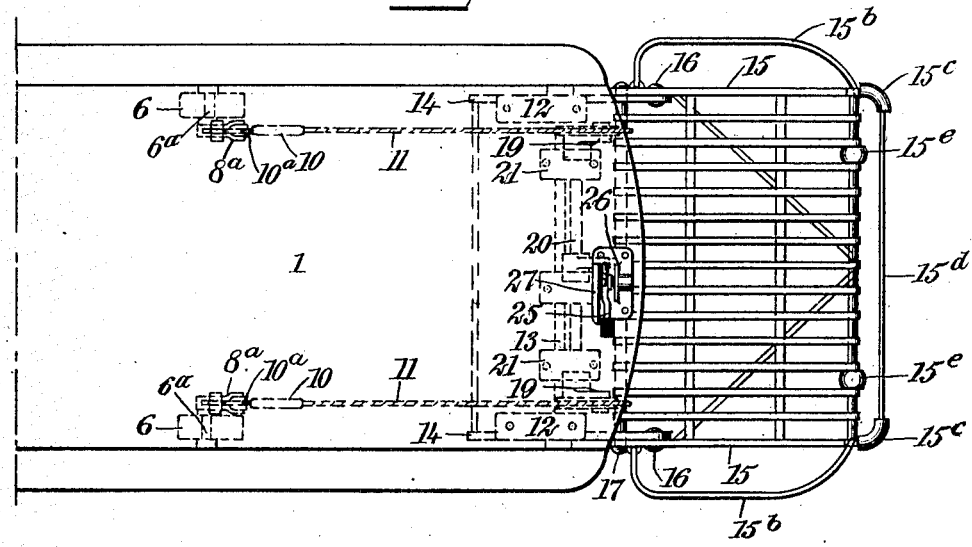
Figure 2:
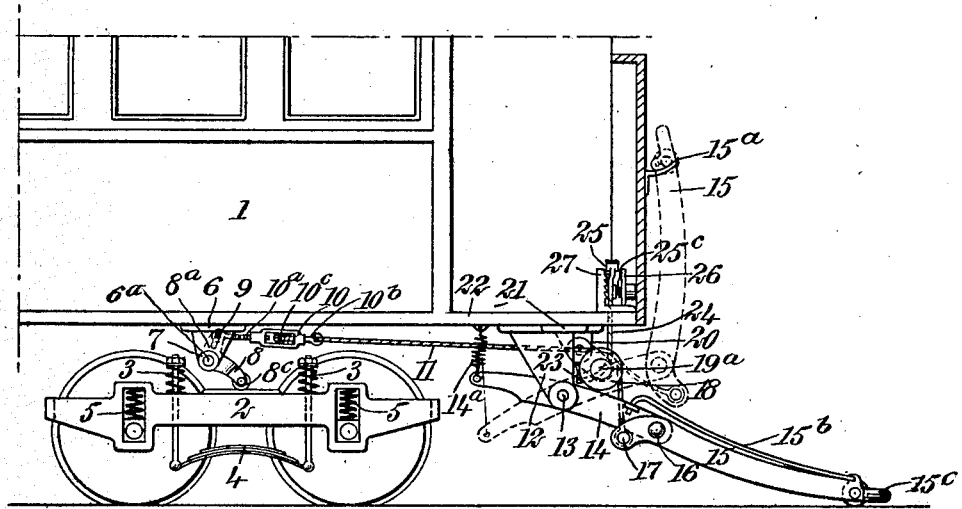

Such objects I accomplish by the means illustrated in the accompanying drawings, in which drawings like characters of reference indicate like parts throughout the views, and in which Figure 1 is a plan view of a fender embodying my invention attached to a car frame; Fig. 2 is a side elevation of the same, partly in section; Fig. 3 is a perspective view of a compensating lever; Fig. 4 is a side elevation of a cushioning device; Fig. 5 is a side elevation of a crank shaft and lever for raising the fender bodily; Fig. 6 is a side elevation of a modification of my invention, partly in section; and Fig. 7 is a detail view partly in section, of a portion of the mechanism shown in Fig. 6.

As illustrated in the drawings, 1 represents a car body supported upon a truck 2, having car springs 3 and 4 and truck springs 5. Brackets 6 are attached to the under side of the body of the car and support bell crank levers. The bell crank levers comprise arms 8 and 8$^a$ having a hub 7, provided with a transverse aperture 7$^a$, and is journaled upon a pin 6$^a$ of the bracket 6. The arm 8$^a$ is provided with a longitudinal slot 8$^b$, and a roller 8$^c$ is journaled on the end of the arm 8. A stud 9 is adjustably secured in the slot 8$^b$ in any suitable manner, and is connected with a rod 10$^a$ which is adjustably secured to one end of a turn buckle 10. A rod 10$^b$ has a longitudinal movement in the opposite end of said turn buckle and supports a spring 10$^c$ arranged within the bars of the turn buckle, which spring is secured in place on said rod by means of a washer 10$^d$ and nut 10$^e$ having a threaded engagement with the end of the rod 10$^b$. The rod 10$^b$ is provided on its outer end with an eye which is secured to one end of a cable 11 preferably made of wire, the opposite end of which cable is secured to a car fender forward of its pivotal attachment to the body of the car.

Brackets 12 are secured to the forward end of the car body and support a transverse shaft 13 upon which are mounted auxiliary side bars 14 of the fender, having a vertical rocking movement. Springs 14$^a$ connect the rear ends of the bars 14 with the body of the car, and the forward ends of said bars are hinged to the side bars 15 of the fender by means of pins 16. The rear ends of the side bars 15 are preferably off-set so as to form levers fulcrumed at 16, and thereby enable the forward end of the fender to be depressed by an upward pull of the cables 11, which are preferably attached to the off-set ends of the side bars 15 and pass over pulleys 18, rotatably mounted upon crank arms 19 fixedly secured to a transverse shaft 20, which shaft is journaled in brackets 21 secured to the platform 22 of the car, as shown in Fig. 5. The transverse shaft 20 is also provided with a segment 23, shown in Fig. 5, rigidly secured to said shaft, and its periphery is grooved to receive a cable 24 one end of which is attached to the segment 23 and the other end to a foot lever 25 which is pivoted to a bracket 26 by means of a pivot pin 25$^a$. The outer portion of the foot lever 25 is provided with a dog which engages the teeth of an arc rack 27$^a$ formed on the bracket 27, which, with the bracket 26, is secured to the platform 22 of the car. When the car is in use and becomes heavily loaded, or the body of the car vibrates quickly up and down when the car is moving rapidly over a rough roadbed, the distance between the car body and truck changes, and the forward end of the fender attached to the body of the car changes its position in a vertical line with the movement of the body of the car. During such movement the forward end of the fender is brought too close to the track at times, or moved so far from the track as to become practically inoperative for the purpose of protection. The bell crank levers 7 overcome such variation in the position of the forward end of the fender, and compensate for the vertical vibration of the body of the car and maintain the forward end of the fender at a constant elevation from the track. As the forward end of the body of the car is depressed toward the truck in consequence of being heavily loaded, or because of the roughness of the roadbed, the rollers 8$^c$ of the arms 8 of the bell crank levers travel forward on the upper portion of the truck frame 2, thereby drawing the arms 8$^a$ of the levers backward, and also the rear ends of the cables 11 which pass over pulleys 18 and are connected at their forward ends with the rear ends of the side bars of the fender, thereby raising the forward end of the fender sufficiently to compensate for the downward movement of the body of the car.

A bar 17 is secured to the off-set ends of the main side bars 15, and extends transversely of the fender so as to bear against the under edge of the auxiliary side bars 14 and lock said fender in engagement with said auxiliary side bars. The studs 9 are made adjustable in the slots 8$^a$ of the compensating levers so as to regulate the extent to which the car fender may be raised by a corresponding movement of the arms 8$^a$ of the bell crank levers. The studs 9 are adjusted in the slots 8ª of the compensating levers in any suitable manner, preferably by means of a threaded nut secured to the end of the studs 9, and adapted thereby to clamp the head of the studs against the compensating lever so as to hold the studs set in any desired position in the slots 8ª. The turn buckles 10 and their connections form cushions adapted to absorb the hard and quick jolting sometimes caused by the truck in making bad switches. The springs 10ᶜ are made strong enough to support the fender and are of sufficient flexibility to yield slightly and thereby deaden such shocks and jolts. The forward end of the fender is held down to its normal position by means of the springs 14ª which connect the rear ends of the auxiliary side bars 14 with the body of the car. The fender is raised and adjusted bodily, with the forward ends of the pivoted auxiliary side bars 14, by means of the transverse shaft 20 having the crank arms 19 upon which are journaled the pulleys 18 by means of crank pins 19ª. As the foot lever 25 is depressed, the circular end of said lever, which is provided with a groove 25ᵇ, raises the cable 24 which in turn rocks the shaft 20 by means of the grooved segment 23 attached to said shaft, thereby raising the crank arms 19 and the rear end of the fender which is connected with said crank arms by means of the cables 11 attached to said fender, and passing over the pulleys 18 mounted on said crank arms. A spring 25ᶜ is arranged between the lever 25 and the bracket 26, pressing the lever 25 against the toothed arc rack 27ª and holding said lever in engagement with said rack. By pressing the lever 25 inward laterally the dog of the lever is released from engagement with the teeth of the rack, and the fender drops by its own weight to the desired elevation.

When the fender is not in use the side bars 15 of the fender may be turned upright against the dash board of the car and maintained in such position by a catch 15ª or other suitable device attached to the body of the car. The fender is provided with side guards 15ᵇ, which may be attached to the main frame of the fender and adapted to be folded over on to said main frame, if desired. The forward ends of the side bars 15 are preferably provided with curved elbows 15ᶜ which may be covered with rubber or other yielding material, and a bar 15ᵈ may be attached to the forward ends of the side bars of the main frame adapted to come in contact with an object in the path of the fender before the main frame of the fender strikes such object, and thereby depress the forward end of the main frame of the fender so as to pass under such object instead of merely striking or riding over it. I prefer in most instances, however, to use a flexible connection between the outer ends to the side bars of the main frame in place of the bar 15ᵈ, such as a chain or cable adapted to be held closer to the ground than a bar, and thereby better adapted to pick up small objects in the path of the car and place them upon the body of the fender. Safety rollers 15ᵉ may be attached to the forward cross bar of the main frame, and are preferably made of yielding material such as rubber, and adapted to come in contact with a steep elevation in front of the car, and protect the forward end of the fender against striking such steep inclination.

In the construction already described, I have embodied my invention in its most preferred form. I do not desire to be limited to such construction, however, as my invention is generic in its nature and includes within its scope other means having the same capabilities. Thus, instead of pivoting the fender to the auxiliary side arms 14, as shown in Figs. 1 and 2, a casing 28 may be hinged at its rear upper end to a bracket 12 secured to the body of the car, and provided with a hinge pin 13.

The fender may be provided with side bars 30 having a sliding engagement with a casing 28 so as to permit the fender to be drawn under the body of the car when the fender is not in use, and springs 29 may be secured to the body of the car so as to bear at their forward ends against the casings 28 of the fender and depress the forward end of the same. Side guards 32 may be attached to the body of the car, provided with supporting pins 32ª on their lower ends, and thereby adapted to support and hold the casing or frame of the fender in position.

Other means than those already described may be used for locking the transverse shaft 20 and the pulleys 18 mounted on said shaft in the desired position, so as to elevate or depress the fender bodily. Thus, a vertically movable rack 36 may be mounted upon the platform of the car and provided on both of its edges with teeth, thereby forming a double rack. The rear teeth of the rack engage a latch 37 secured to the platform of the car and the teeth of the forward edge of the rack mesh with a toothed segment 35 rigidly secured to the shaft 20, so that by depressing the rack 36 the toothed segment 35 of the shaft 20 is rotated thereby and the pulleys 18 which support the cables 11 are raised to the desired extent. A spring-pressed pin 38 is arranged forward of the rack 36, and bears against the forward edge of said rack so as to keep the rear edge of the rack in engagement with the latch 37 secured to the car frame. By pressing the rack 36, however, against the spring-pressed pin 38 the teeth forming the rear rack are released from engagement with the latch 37 of the platform, and the rack is enabled to descend and rotate the toothed segment 35. The rear edge of the rack is provided with ratchet teeth which permit the bar to descend when pressed against the spring 35, and lock said bar against upward movement when the rack bar is pressed by the pin 38.

Having thus described my invention, what I claim as new and desire to secure by Letters Patent is:

1. The combination with a car body supported upon a truck, of a fender mounted on said body, mechanism adapted to compensate for the vertical movement of the body on its truck and maintain the forward end of the fender at a constant elevation, comprising a bell crank lever mounted on the body and adapted to bear against said truck, and mechanism connecting said lever with said fender, substantially as shown and described.

2. The combination with a car body supported upon a truck, of a fender mounted on said body, compensating mechanism adapted to maintain the forward end of said fender at a constant elevation, consisting of a bell crank lever mounted to rock on said body and to bear against said truck, and mechanism connecting said lever and fender, provided with a cushioning device, substantially as shown and described.

3. The combination with a car body, supported upon a truck, of a fender mounted on said body, compensating mechanism adapted to maintain the forward end of the fender at a constant elevation, comprising a lever rockably mounted upon said body and adapted to bear against said truck, means for connecting said lever and fender having a turn buckle provided with a rod having a longitudinal movement therein, and a spring mounted on said rod, substantially as shown and described.

4. The combination with a car body supported on a truck, of a fender mounted on said body, compensating mechanism adapted to maintain the forward end of the fender at a constant elevation, means connecting said compensating mechanism and said fender, and a rock shaft journaled on said car body, and provided with means adapted to raise and lower said fender bodily, substantially as shown and described.

5. The combination with a car body supported upon a truck, of a fender mounted upon said body, compensating mechanism adapted to maintain the forward end of the fender at a constant elevation, a rock shaft journaled on said car body adapted to support said fender, and means secured to the end platform of the car adapted to rock said shaft, substantially as shown and described.

6. The combination with a car body supported upon a truck, of a fender having auxiliary side bars pivoted to said body, a main frame pivoted to the outer end of said side bars, compensating mechanism adapted to maintain the forward end of said fender at a constant elevation, means for connecting the inner end of said main frame of the fender with said compensating mechanism, and a rock shaft journaled on said car body, and provided with means adapted to operate the outer ends of said auxiliary bars and raise the main frame of the fender bodily, substantially as shown and described.

7. The combination with a car body supported upon a truck, of a fender mounted on said body, compensating mechanism adapted to maintain the forward end of the fender at a constant elevation, a rock shaft journaled on the end platform of the car body to support said fender, a lever mounted on the said end platform adapted to engage a toothed rack, and means for connecting said lever with said rock shaft, substantially as shown and described.

8. The combination with a car body supported upon a truck, of a fender mounted on said body and provoded with side guards adapted to be turned over on to said fender, compensating mechanism adapted to maintain the forward end of the fender at a constant elevation, and means for adjusting the main frame of the fender bodily in a vertical direction, substantially as shown and described.

9. The combination with a car body supported upon a truck, of a fender comprising auxiliary side bars mounted to rock on said body, and provided on their inner ends with a spring connected with said body, a main frame pivoted to said auxiliary bars and provided with side bars having off-set inner ends connected with said compensating mechanism, and a transverse locking bar secured to the off-set ends of the side bars of the main frame of the fender adapted to bear against the under side of said auxiliary bars and lock said fender in position when the fender is depressed, substantially as shown and described.

In testimony whereof I have signed my name to this specification in the presence of two subscribing witnesses.

GUSTAF M. ANDERSSON.

Witnesses:
EDWARD GEORGE MacILROY,
EDWARD DAVE FRANK.